US009647508B2

(12) United States Patent
Kaler

(10) Patent No.: US 9,647,508 B2
(45) Date of Patent: May 9, 2017

(54) HVAC SYSTEM HAVING KINETIC ENERGY STORAGE DEVICE

(71) Applicant: George Michael Kaler, Trophy Club, TX (US)

(72) Inventor: George Michael Kaler, Trophy Club, TX (US)

(73) Assignee: Mestek, Inc., Westfield, MA (US)

( * ) Notice: Subject to any disclaimer, the term of this patent is extended or adjusted under 35 U.S.C. 154(b) by 640 days.

(21) Appl. No.: 14/038,003

(22) Filed: Sep. 26, 2013

(65) Prior Publication Data

US 2014/0083656 A1    Mar. 27, 2014

Related U.S. Application Data

(60) Provisional application No. 61/706,276, filed on Sep. 27, 2012.

(51) Int. Cl.
| H02K 7/02 | (2006.01) |
| H02J 9/06 | (2006.01) |
| H02J 15/00 | (2006.01) |
| H02J 3/00 | (2006.01) |

(52) U.S. Cl.
CPC ............... *H02K 7/025* (2013.01); *H02J 9/06* (2013.01); *H02J 15/00* (2013.01)

(58) Field of Classification Search
CPC ...................................................... H02J 3/00
USPC ......................................................... 307/65
See application file for complete search history.

(56) References Cited

U.S. PATENT DOCUMENTS

| 6,657,320 | B1 | 12/2003 | Andrews et al. | |
| 7,573,144 | B1* | 8/2009 | Saban | H02J 3/30 |
| | | | | 290/4 R |
| 2004/0148934 | A1* | 8/2004 | Pinkerton | F02C 6/16 |
| | | | | 60/646 |
| 2009/0072624 | A1* | 3/2009 | Towada | G06F 11/2015 |
| | | | | 307/65 |
| 2011/0146315 | A1 | 6/2011 | Zakrzewski | |
| 2011/0215645 | A1 | 9/2011 | Schomburg et al. | |
| 2013/0049473 | A1* | 2/2013 | Brech | H02J 9/08 |
| | | | | 307/68 |

OTHER PUBLICATIONS

International Search Report dated Feb. 20, 2014 from corresponding PCT Patent Application No. PCT/US2013/062073.

* cited by examiner

*Primary Examiner* — Robert Deberadinis
(74) *Attorney, Agent, or Firm* — Grogan, Tuccillo & Vanderleeden, LLP

(57) ABSTRACT

According to the present invention an HVAC system is provided. The HVAC system includes a heat exchanger containing a cooling fluid to be circulated, a blower assembly configured to generate an inlet air stream through said heat exchanger, and a kinetic energy storage device. The blower assembly is powered by an external electrical power supply. The kinetic energy storage device is configured to provide auxiliary power to the blower assembly in the event of an interruption of the external electrical power supply.

17 Claims, 1 Drawing Sheet

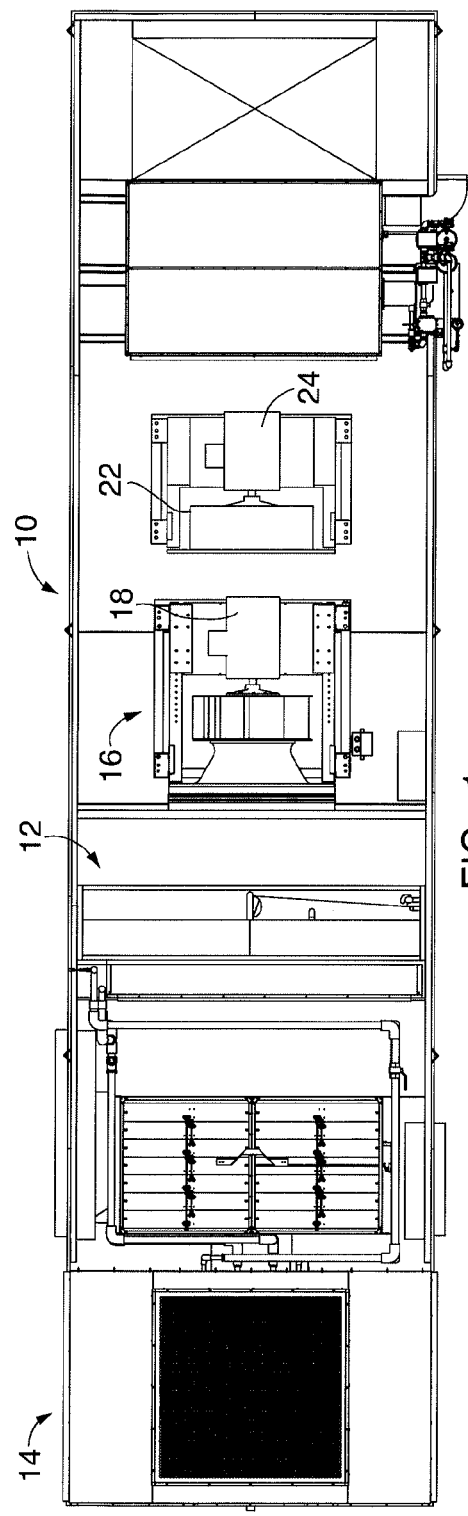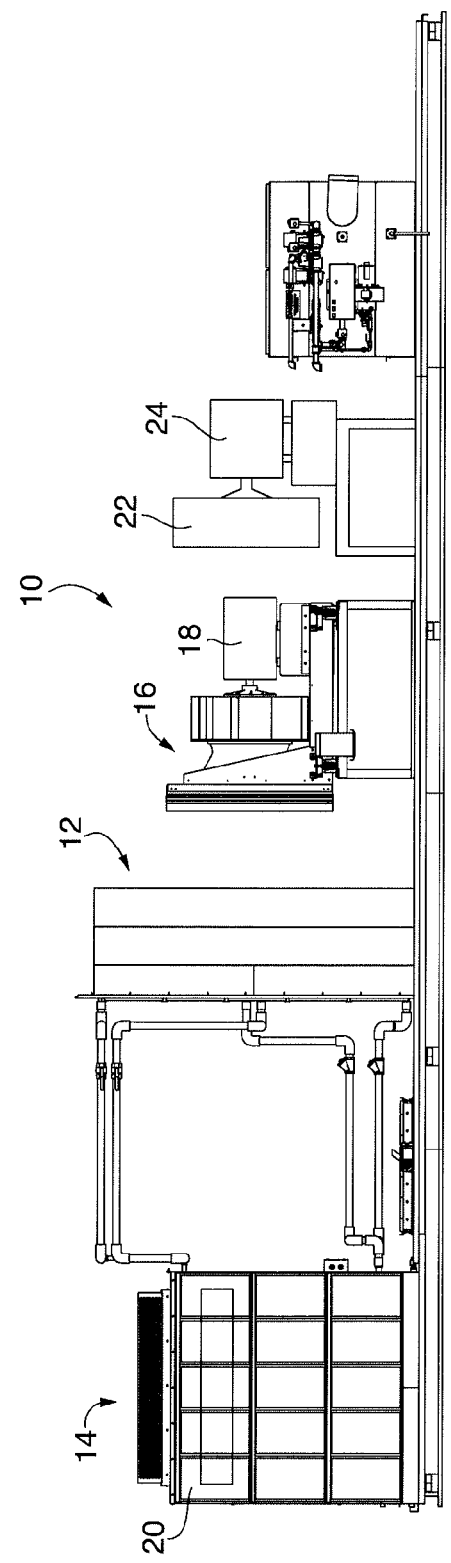

HVAC SYSTEM HAVING KINETIC ENERGY STORAGE DEVICE

CROSS REFERENCE TO RELATED APPLICATIONS

This application claims the benefit of U.S. Provisional Application Ser. No. 61/706,276, filed on Sep. 27, 2012, which is herein incorporated by reference in its entirety.

FIELD OF THE INVENTION

The present invention relates generally to HVAC systems and, more particularly, to a device for maintaining the operation of an HVAC system in the event of a loss of electrical power.

BACKGROUND OF THE INVENTION

Buildings typically use HVAC systems to selectively control indoor temperature, pressure, ventilation rate and other variables. One particular application of HVAC systems is for the cooling and humidity control of data centers. HVAC systems for this application typically include one or more HVAC units that are floor standing, but may also be wall-mounted, rack-mounted or ceiling-mounted. The HVAC units provide cooled air either to a raised-floor plenum, to a network of air ducts, or to the open air of the data center. Importantly, maintaining data centers at desired temperatures helps prevent computer hardware within the data center from overheating and malfunctioning.

In connection with the above, one of the key issues facing the data center industry in particular is the potential for loss of external electrical power. Loss of external power can have enormous negative effects on the data center, the IT hardware in the center, and the actual data that is being processed when such an event occurs. Most modern data centers employ some form of uninterruptable power supply ("UPS") that is configured to automatically switch to a battery backup system when the supply of main electrical power is interrupted in order to keep the IT servers running for a limited period of time. During such limited period of time, the backup generator systems serving the data center can be started and/or the data center staff can initiate a shutdown cycle for the serves to prevent the loss of data. However, because roughly half of the electrical demand in a data center is produced by the HVAC equipment that cools the IT equipment, many data centers lack UPS back up for their HVAC systems and instead rely solely upon a rapid recovery via the generator sets.

Several things can occur in rapid succession in this conventional arrangement. First, if the IT equipment is operating at the new elevated inlet temperatures recommended by ASHRAE, the equipment is already operating closer to automatic shutdown temperatures. When the HVAC system fails as a result of an electrical power interruption, the server temperatures rise rapidly past their safe operating threshold and they shut themselves down in mid-process. This rapid rise in temperature can occur in seconds once a loss in power occurs. The second event is the startup cycle for the generators, which can take anywhere from 1 to 5 minutes. As will be readily appreciated, however, this is too long given the rapid IT equipment temperature rise. Finally, if the data center uses a chiller system the chillers themselves can take up to 10 minutes to restore full capacity.

In view of the above, there is a need for an improved means for maintaining operation of an HVAC system in the event of a loss of electrical power, without the need for connection to an external backup generator or other alternative power source.

SUMMARY OF THE INVENTION

It is an object of the present invention to provide an HVAC system having a kinetic energy storage device.

It is another object of the present invention to provide an HVAC system having a kinetic energy storage device that obviates the need for a connection to an external backup generator or other alternative power source.

It is another object of the present invention to provide an HVAC system having a kinetic energy storage device that provides for continuous operation of temperature critical or IT cooling equipment during an electrical power interruption.

It is another object of the present invention to provide an HVAC system having a kinetic energy storage device that is environmentally friendly.

It is another object of the present invention to provide an HVAC system having a kinetic energy storage device that provides for sufficient time for a controlled shutdown of critical IT equipment in the event of a prolonged power interruption.

According to the present invention an HVAC system is provided. The HVAC system includes a heat exchanger containing a cooling fluid to be circulated, a blower assembly configured to generate an inlet air stream through said heat exchanger, and a kinetic energy storage device. The blower assembly is powered by an external electrical power supply. The kinetic energy storage device is configured to provide auxiliary power to the blower assembly in the event of an interruption of the external electrical power supply.

In an embodiment of the present invention an auxiliary power generating mechanism for maintaining power in an HVAC system in the event of an interruption in external electrical power supply is provided. The auxiliary power generating mechanism includes a flywheel and a motor-generator operatively connected to the flywheel.

According to the present invention, a method for maintaining operation of a cooling system in the event of an external electrical power interruption includes operating a blower assembly to initiate a flow of inlet air, cooling the inlet air by passing the inlet air through a heat exchanger, storing kinetic energy while external electrical power is available, and releasing the stored kinetic energy to produce auxiliary electrical power for use by the blower assembly when the external electrical power is interrupted.

These and other objects, features, and advantages of the present invention will become apparent in light of the detailed description of the best mode embodiment thereof, as illustrated in the accompanying drawings.

BRIEF DESCRIPTION OF THE DRAWINGS

The present invention will be better understood from reading the following description of non-limiting embodiments, with reference to the attached drawings, wherein below:

FIG. 1 is a top plan view of an HVAC system having a kinetic energy storage device, for use in a data center, according to an embodiment of the present invention.

FIG. 2 is a side elevational view of the HVAC system of FIG. 1.

DETAILED DESCRIPTION OF THE PREFERRED EMBODIMENT

Referring to FIGS. 1 and 2, an HVAC system 10 according to an embodiment of the present invention is shown. As will be readily appreciated, the configuration of the HVAC system 10 is similar to existing HVAC systems in construction and general operation and, as such, may be of any type and configuration commonly known in the art and utilized for cooling rooms within a structure. As shown therein, the system 10 generally includes a first heat exchanger, namely a cooling coil 12, a cooling tower 14, a blower assembly 16 and an electric motor 18 electrically coupled to the blower. The blower assembly 16 is configured to draw inlet (outside) air into the system and pull the air through a face of the cooling coil 12. As warm inlet air passes through the cooling coil 12, heat from the air is transferred to a cooling fluid circulating within the cooling coil 12. The now-cooled inlet air may then be forced into a structure or rooms with a structure to provide cooling, in a manner known in the art.

As best shown in FIG. 2, a portion of the cooling coil 12 is located within the cooling tower 14. A pump (not shown) continuously circulates the cooling fluid in the cooling coil 12 between the face of the cooling coil 12 adjacent to the blower 16 and the cooling tower 14. In particular, in operation, as heat is transferred from the inlet air to the cooling fluid to cool the inlet air, the cooling fluid is circulated through the coiling coil 12 and to the cooling tower 14. As also shown in FIG. 2, the cooling tower 14 may include a secondary heat exchanger 20, such as a liquid-to-liquid heat exchanger, fluidly isolated from the cooling coil 12. The secondary heat exchanger 20 serves to remove heat from the cooling fluid in the cooling coil 12 as it passes through the cooling tower 14, allowing the cooling fluid to "recharge."

As is therefore known in the art, 'warm' inlet air is drawn into the system 10 by the blower assembly and then cooled. This cooled air is then provided to a raised-floor plenum, to a network of air ducts, or to the open air of a room or rooms within a structure to provide cooling, as desired.

The system 10 also includes a controller (not shown) electrically coupled to the pump and blower motor 18 for controlling the circulation of cooling fluid and air in dependence upon user inputs to provide a desired level and rate of cooling for a structure, as is known in the art.

As alluded to above, because the blower motor 18 is powered by an external electrical power supply, when the supply of power is interrupted such as during a power outage and the like, the blower assembly 16 ceases pulling air into the system and, as a result, the HVAC system 10 is no longer operable to provide cooling to the structure. As discussed above, this is particularly undesirable where temperatures within the structure must be kept below a certain level, such as in data centers where IT equipment such as servers and the like, are housed. As used herein, "external electrical power supply" means mains electricity, such as the general-purpose alternating-current (AC) power supply provided to a building.

In order to obviate this problem, the HVAC system of the present invention also includes a kinetic energy storage device that is configured to selectively provide auxiliary electrical power to the HVAC system in the event of an external electrical power interruption. As shown in FIGS. 1 and 2, the kinetic energy storage device preferably takes the form of a weighted flywheel 22 that is rotationally driven by the output shaft of a motor/generator 24. During normal operation, the flywheel 22 is turned by the motor/generator 24 using the external electrical power supply. Importantly, the action of spinning the flywheel 22 stores kinetic energy in the mass of the flywheel. When an electrical power failure occurs the flywheel 22 continues to rotate, releasing the stored kinetic energy over a period of time.

In the preferred embodiment, when external electrical power is lost, a set of switches are commanded by the controller to convert the motor/generator 24 into a pure generator of electricity that is then converted to an AC power source (through a conventional DC to AC power convertor) that will provide sufficient electrical energy to maintain operation of the HVAC equipment. In particular, when external electrical power is interrupted, the rotational energy of the flywheel 22 drives the motor/generator 24 in order to produce auxiliary electricity. This electricity is then converted to AC power through a power converter, which can then be utilized to power the cooling fluid pump (not shown) and the blower assembly 16 in order to maintain operation of the HVAC system 10 and maintain cooling. In this manner, the motor/generator 24 is electrically coupled to the cooling fluid pump, the flywheel assembly 16 and motor 18, and other components of the HVAC system 10 that utilize electrical power through a series of switches (not shown).

As will be readily appreciated, the flywheel 22 and generator 24 are therefor configured to provide auxiliary power for a period of time sufficient to allow the external generators and backup systems to come on line. Importantly, and in stark contrast to existing systems, no external source of electricity is required while the flywheel/generator is in operation. As the flywheel 22 and generator 24 are configured to automatically provide auxiliary power in the event of an external electrical power supply interruption, continuous operation of the HVAC system 10 may be realized. Accordingly, the HVAC system 10 of the present invention eliminates the possibility of temperature spikes resulting from external electrical power loss, which is critical in certain applications such as in data centers that house temperature-critical IT equipment.

An alternative arrangement would see the motor/generator/flywheel assembly continuously generating DC power for the HVAC equipment. In this arrangement no "switchover" circuitry would be required and the response to a power outage would be instantaneous. This configuration would also facilitate the use of brushless DC motors for the HVAC equipment fans and pumps. These types of systems are more energy efficient and allow simpler implementation of variable speed strategies for further energy reduction.

Notably, integrating the flywheel kinetic energy storage device directly into the HVAC system provides for essentially instant response to an electrical power failure or a utility imposed demand control incident. Moreover, the system 10 provides for continuous operation of temperature critical or IT cooling equipment during an outage, and factory load matched capacity back up cooling power for a predetermined period of time.

In addition, by utilizing the system of the present invention, capital cost avoidance at the facility level as a separate HVAC UPS system is no longer needed. Moreover, the flywheel kinetic energy storage system provides energy storage that is more environmentally friendly than using batteries or the like, and it has a longer useful life than existing battery backup systems. In addition, the invention provides for sufficient time for a "graceful" shut down of critical IT equipment in the event of a prolonged power outage.

As will be readily appreciated, the kinetic energy storage device of the present invention may be easily retrofitted into existing HVAC systems to provide a level of operability heretofore not seen in the art. In connection with this, the kinetic energy storage device of the present invention obviates the need for costly and tedious rewiring to provide battery backup or other means of auxiliary power, as is often required when modifying existing HVAC systems to provide backup capabilities.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. An HVAC unit, comprising:
a heat exchanger containing a cooling fluid to be circulated;
a blower assembly configured to generate an inlet air stream through said heat exchanger, said blower assembly being powered by an external electrical power supply; and
a kinetic energy storage device configured to provide auxiliary power to said blower assembly in the event of an interruption of said external electrical power supply.

2. The HVAC unit of claim 1, wherein:
said kinetic energy storage device is a flywheel.

3. The HVAC unit of claim 2, wherein:
said flywheel is driven by a motor/generator powered by said external electrical power supply.

4. The HVAC unit of claim 3, further comprising:
a power converter electrically coupled to said motor/generator, said power converter being configured to convert DC power produced by said motor/generator into AC power for use by said blower assembly.

5. The HVAC unit of claim 4, further comprising:
an array of switches configured to selectively provide an electrical pathway from said motor/generator to said blower assembly in the event of an interruption of said external electrical power supply.

6. The HVAC unit of claim 1, further comprising:
a motor mechanically coupled to said blower assembly for driving said blower assembly, said motor being power by said external electrical power supply.

7. The HVAC unit of claim 1, wherein:
said HVAC system is deployed in a data center having temperature-critical IT equipment.

8. An auxiliary power generating mechanism for maintaining power in an HVAC unit in the event of an interruption in external electrical power supply, said auxiliary power generating mechanism comprising:
a flywheel; and
a motor-generator operatively connected to said flywheel;
wherein said HVAC unit includes a heat exchanger containing a cooling fluid to be circulated and a blower assembly configured to generate an inlet air stream through said heat exchanger, said blower assembly being powered by an external electrical power supply.

9. The auxiliary power generating mechanism of claim 8, wherein:
said motor-generator is operable in a power-consumption mode wherein said external electrical power supply is utilized by said motor-generator to produce a rotational output to rotate said flywheel; and
wherein said motor-generator is operable in a power-generation mode whereby rotational energy stored in said flywheel is utilized to drive said motor-generator to produce auxiliary electrical power in the event of an interruption in said external electrical power supply.

10. The auxiliary power generating mechanism of claim 8, wherein:
said motor-generator is electrically coupled to said blower assembly and is configured to automatically provide auxiliary electrical power to said blower assembly when said external electrical power supply is interrupted.

11. The auxiliary power generating mechanism of claim 10, further comprising:
at least one switch configured to selectively provide an electrical pathway from said motor-generator to said blower assembly in the event of an interruption of said external electrical power supply.

12. The auxiliary power generating mechanism of claim 8, further comprising:
a power converter electrically coupled to said motor-generator, said power converter being configured to convert DC power produced by said motor-generator into AC power for use by said blower assembly.

13. A method for maintaining operation of a HVAC unit in the event of an external electrical power interruption, said method comprising the steps of:
operating a blower assembly to initiate a flow of inlet air;
cooling said inlet air by passing said inlet air through a heat exchanger;
producing and storing kinetic energy within a housing of said HVAC unit while external electrical power is available; and
releasing said stored kinetic energy to produce auxiliary electrical power for use by said blower assembly when said external electrical power is interrupted.

14. The method according to claim 13, wherein:
said kinetic energy is stored and released by a flywheel.

15. The method according to claim 14, wherein:
a motor-generator having a rotational output rotates said flywheel to store said kinetic energy when said external electrical power is available; and
said flywheel releases said stored kinetic energy to drive said motor-generator to produce said auxiliary power when said external electrical power is interrupted.

16. The method according to claim 13, further comprising the step of:
automatically switching from external electrical power to auxiliary power when said external electrical power is interrupted.

17. The method according to claim 13, wherein:
said cooling system is deployed in a data center.

* * * * *